United States Patent [19]
Hamilton

[11] Patent Number: 6,001,890
[45] Date of Patent: Dec. 14, 1999

[54] OPEN CELLED CELLULAR POLYURETHANE PRODUCTS

[75] Inventor: James Alan Hamilton, Leefdaal, Belgium

[73] Assignee: Imperial Chemical Industries PLC, London, United Kingdom

[21] Appl. No.: 09/066,919

[22] Filed: Apr. 27, 1998

[30] Foreign Application Priority Data

May 1, 1997 [IN] India ................... 1124/Del/97

[51] Int. Cl.⁶ ....................................... C08J 9/04
[52] U.S. Cl. .................... 521/128; 521/130; 521/163; 521/164; 521/166; 521/170; 521/172; 521/174; 521/177
[58] Field of Search ..................... 521/128, 130, 521/170, 163, 164, 166, 172, 174, 177

[56] References Cited

U.S. PATENT DOCUMENTS

| | | |
|---|---|---|
| 3,884,848 | 5/1975 | Ricciardi et al. . |
| 4,058,492 | 11/1977 | Von Bonin et al. . |
| 4,668,555 | 5/1987 | Uekado et al. . |
| 4,751,253 | 6/1988 | Tylenda . |
| 4,919,878 | 4/1990 | Pilger et al. . |
| 5,451,615 | 9/1995 | Birch . |
| 5,457,138 | 10/1995 | Yuge et al. . |

FOREIGN PATENT DOCUMENTS

| | | |
|---|---|---|
| 0 000 933 A1 | 12/1980 | European Pat. Off. . |
| 0 498 628 A1 | 2/1992 | European Pat. Off. . |
| 960855 | 3/1957 | Germany . |
| 61-000215 | 1/1986 | Japan . |
| 9 637 533 | 11/1966 | WIPO . |
| WO96/25455 | 1/1996 | WIPO . |
| 9 625 455 | 8/1996 | WIPO . |

*Primary Examiner*—John M. Cooney, Jr.
*Attorney, Agent, or Firm*—Pillsbury Madison & Sutro Intellectual Property Group

[57] ABSTRACT

Process for making open celled (semi-) rigid polyurethane foams using as cell opening agent a fatty acid or a fatty acid amine or a fatty acid amide or a fatty acid ester.

21 Claims, No Drawings

OPEN CELLED CELLULAR POLYURETHANE PRODUCTS

BACKGROUND OF THE INVENTION

This invention relates to cellular polyurethane materials having open cells and in particular to the use of certain cell opening agents to make these foams.

The production of foamed materials based on polyurethane and other polymer systems derived from organic polyisocyanates is well established. Depending upon the formulations used in their manufacture, the products can vary in texture from the soft flexible foams used as cushioning materials to the (semi-)rigid foams used as insulating or structural materials.

Whereas flexible foams are of the open cell type, (semi-)rigid foams can be either closed celled or open celled. An important use of open celled (semi-)rigid foam is as filler in evacuated insulation panels, as described, for example, in JP-A-133870/82, EP-A-498628, EP-A-188806. Another recently developed use of open celled (semi-)rigid foam is as filler for the core between the outer and inner walls of a thermal insulating device such as a refrigerator, a freezer or a boiler. To obtain good insulation properties the core is then afterwards evacuated and hermetically sealed. In order to maintain the required high vacuum it has been proposed to permanently connect the unit to a vacuum pump mounted in the unit itself (see WO 95/20136). Alternatively the foamed cavity after evacuation can be refilled with an insulating gas and then sealed, such as described in WO 97/21767.

Open celled (semi-)rigid polyurethane foam is made by reacting an organic polyisocyanate with a polyfunctional isocyanate-reactive composition in the presence of a blowing agent and a cell opening agent. Various cell opening techniques have been described in the past. These include the use of said cell opening agents such as polyethylene and polytetrafluoroethylene (as described, for example, in U.S. Pat. No. 5,312,846, U.S. Pat. No. 5,281,632 and U.S. Pat. No. 5,250,579), the use of silicone and non-silicone surfactants (as described, for example, in DE 3928867 and DE 3122790), the use of steam and the use of isocyanate-reactive cyclic urea's (as described, for example, in EP-A-498628 and EP-A-498629).

In most of the applications of open celled (semi-) rigid polyurethane foam a high open celled content (>85%) is necessary. Particularly in the case of moulded foam (for example, when used to fill the core of a thermal insulating device) it has been proven very difficult with the existing cell opening techniques to obtain a high open celled content at high overpack and a minimum closed cell gradient (from the skin towards the core of the foam).

Therefore it is an object of the present invention to provide a new cell opening technique for (semi-)rigid polyurethane foams not showing the disadvantages mentioned above.

BRIEF SUMMARY OF THE INVENTION

The present invention provides a process for making open celled (semi-)rigid polyurethane foams using as cell opening agent a fatty acid or a fatty acid amine or a fatty acid amide or a fatty acid ester.

DETAILED DESCRIPTION OF THE INVENTION

The term "fatty acid" as used herein is to describe organic carboxylic acids (mono and/or dibasic) having from 7 to 100 carbon atoms, preferably from 10 to 25 carbon atoms, most preferably from 12 to 18 carbon atoms, which can be saturated or unsaturated, aliphatic or cycloaliphatic, unsubstituted or substituted with other functional groups such as hydroxyl groups. Suitable fatty acids from which the present cell opening agents can be derived include lauric acid, myristoleic acid, palmotoeic acid, palmitic acid, linoleic acid, oleic acid, cetyl acid, stearyl acid. Blends of one or more or these fatty acids are also suitable.

These fatty acids can be used as such or derivatives thereof in the form of amines, amides or esters can be used. So when the fatty acid corresponds to R—COOH, the amine corresponds to R—NR'R", the amide corresponds to R-CO-NR'R" ester corresponds to R—COOR'" wherein R' and R" represent hydrogen or an alkyl group having from 7 to 10 carbon atoms and R'" represents an alkyl group having from 1 to 10 carbon atoms. Since the acids can be polyfunctional, the amines, amides and esters derived therefrom can be polyfunctional as well (for example, fatty acid diamines). Polyesters derived from said fatty acid by crosslinking with agents such as glycerol or trimethylolpentane can also be sued as well as fully or partially esterified products obtained by reacting the fatty acid with sugars such as sucrose or sorbitol, optionally followed by ethoxylation or propoxylation. The amine, amide and ester derivatives of fatty acids are preferably used according to the present invention.

Examples of suitable cell opening agents according to the present invention include tallow diamines (which are complex mixtures of $C_{14}$–$C_{32}$ diamines), mixtures of tallow diamines with fatty acid esters such as the commercially available products INT 494/792/0, 494/792/1, 494/792/2 and 494/792/4 available from Münch Chemie-Labor and the following fatty acid diamines $C_{19}H_{38}NH_2)_2$, $C_{23}H_{46}(NH_2)_2$ and $C_{25}H_{50}(NH_1)_1$.

Mixtures of two or more of the above described cell opening agents can be used.

The cell opening agents of the present invention are used in amounts of between 0.1 and 20% by weight, preferably between 0.5 and 5% by weight and most preferably between 0.5 and 2% by weight based on the foam.

Suitable organic polyisocyanates for use in the preparation of open celled (semi-)rigid polyurethane foams of the present invention include any of those known in the art for the preparation of (semi-)rigid polyurethane or urethane-modified polyisocyanurate foams, and in particular the aromatic polyisocyanates such as diphenylmethane diisocyanate in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, toluene diisocyanate in the form of its 2,4- and 2,6-isomers and mixtures thereof, 1,5-naphthalene diisocyanate and 1,4-diisocyanatobenzene. Other organic polyisocyanates which may be mentioned include the aliphatic diisocyanates such as isophorone diisocyanate, 1,6-diisocyanatohexane and 4,4'-diisocyanatodicyclohexylmethane.

Polyfunctional isocyanate-reactive compositions for use in the preparation of open celled (semi-rigid polyurethane foams of the present invention include any of those known in the art for the preparation of semi-rigid polyurethane or urethane-modified polyisocyanurate foams. Of particular importance for the preparation of (semi-) rigid foams are polyols and polyol mixtures having average hydroxyl numbers of from 300 to 1000, especially from 300 to 700 mg KOH/g, and hydroxyl functionalities of from 2 to 8, especially from 3 to 8. Suitable polyols have been fully described in the prior art and include reaction products of alkylene oxides, for example ethylene oxide and/or propylene oxide, with initiators containing from 2 to 8 active hydrogen atoms per molecule. Suitable initiators include: polyols, for example glycerol, trimethyolpropane, trietnanolamine, pentaerythritol, sorbitol and sucrose; polyamines, for example ethylene diamine, tolylene diamine, diaminodiphenylmethane and polymethylene polyphenylene polyamines; and aminoalcohols, for example ethanolamine and diethanolamine; and mixtures of such initiators. Other suitable polymeric polyols include polyesters obtained by the condensation of appropriate proportions of glycols and higher functionality polyols with dicarboxylic or polycarboxylic acids. Still further suitable polymeric polyols include hydroxyl terminated polythioethers, polyamides, polyesteramides, polycarbonates, polyacetals, polyolefins and polysiloxanes. Preferred isocyanate-reactive compounds are polyether polyols initiated by sorbitol or etohylenediamine or diaminodiphenylmethane or polymethylene polyphenylene polyamine.

The quantities of the polyisocyanate compositions and the polyfunctional isocyanate-reactive compositions to be reacted will depend upon the nature of the (semi-)rigid polyurethane or urethane-modified polyisocyanurate foam to be produced and will be readily determined by those skilled in the art.

The preparation of open celled (semi-) rigid polyurethane foam may be carried out in the presence of any of the blowing agents known in the art for the preparation of (semi-) rigid polyurethane or urethane-modified polyisocyanurate foams. Such blowing agents include water or other carbon dioxide-evolving compounds, or inert low boiling compounds having a boiling point of above −70° C. at atmospheric pressure. Examples of such inert low boiling compounds include chlorofluorocarbons, hydrochlorofluorocarbons such as 1,1-dichloro-1-fluoroethane, hydrofluorocarbons such as 1,1,1-trifluoro-2-fluoroethane and 1,1,1-trifuoro-3,3-difluororopane and hydrocarbons such as isobutane, n-pentane, isopentane, cyclopentane and any mixtures thereof.

The open celled (semi-)rigid polyurethane foam to be used in the present invention may be of normal cell size, i.e. having cell sizes in the range 5 mm to 0.1 mm. In order to further lower the thermal conductivity open celled (semi-) rigid polyurethane foams having decreased cell sizes (in the range 50 to 150 micron) are preferably used. These fine celled open celled (semi-) rigid polyurethane foams can be obtained by incorporating an insoluble fluorinated compound into the foam-forming mixture or by controlled air nucleation as known in the art.

The term insoluble as used herein with reference to the insoluble fluorinated compound to be used in the preparation of fine celled open celled (semi-) rigid polyurethane foam is defined as showing a solubility in either the isocyanate-reactive composition or the polyisocyanate composition with which it is to be blended of less than 500 ppm by weight at 25° C. and atmospheric pressure.

Insoluble fluorinated compounds for use in the preparation of fine celled open celled (semi-) rigid polyurethane foam include any of those disclosed in U.S. Pat. No. 4,981,879, U.S. Pat. No. 5,034,424, U.S. Pat. No. 4,972,002, EP-A-0508649, EP-A-0498628 and WO 95/18176. The term substantially fluorinated as used herein with reference to the insoluble, substantially fluorinated compound to be used in the preparation of fine celled open celled (semi-) rigid polyurethane foam is to be understood to embrace compounds in which at least 50% of the hydrogen atoms of the unfluorinated compounds are replaced by fluorine. Suitable compounds include substantially fluorinated or perfluorinated hydrocarbons, substantiality fluorinated or perfluorinated ethers, substantially fluorinated or perfluorinated tertiary amines, substantially fluorinated or perfluorinated amino-ethers and substantially fluorinated or perfluorinated sulphones. Particular mention may be made of the various isomers of perfluoropentane and perfluorohexane such as perfluoro-n-pentane and perfluoro-n-hexane and perfluoro (4-methylpent-2-ene). Certain insoluble fluorinated compounds suitable for use in the preparation of fine celled open celled (semi-)rigid polyurethane foam may themselves act as blowing agents under the conditions pertaining to the foam-forming reaction, particularly where their boiling point is lower than the exotherm temperature achieved by the reaction mixture. For the avoidance of doubt, such materials may, partly or completely, fulfil the function of blowing agent in addition to that of insoluble fluorinated compound. The amount of the insoluble fluorinated compound to be used in the preparation of fine celled open celled (semi-) rigid polyurethane foam ranges from 0.05 to 10%, preferably from 0.1 to 5%, most preferably from 0.6 to 2.3% by weight based on the total foam-forming composition.

The insoluble fluorinated compound will usually be incorporated in the foam-forming reaction mixture in the form of an emulsion or preferably a microemulsion in one of the major components, that is to say in the isocyanate-reactive component and/or the polyisocyanate component. Such emulsions or microemulsions may be prepared using conventional techniques and suitable emulsifying agents. Emulsifying agents suitable for preparing stable emulsions or microemulsions of fluorinated liquid compounds in organic polyisocyanates and/or isocyanate-reactive compounds include surfactants chosen from the group of nonionic, ionic (anionic or cationic) and amphoteric surfactants. Preferred surfactants are fluoro surfactants, silicone surfactants and/or alkoxylated alkanes. The amounts of emulsifying agent used is between 0.02 and 5 pbw per 100 pbw of foam forming reaction system and between 0.05 and 10 pbw per 100 pbw of polysiocyante or polyol composition.

In addition to the polyisocyanate and polyfunctional isocyanate-reactive compositions, the blowing agent and the cell opening agent, the foam-forming reaction mixture will commonly contain one or more other auxiliaries or additives conventional to formulations for the production of open celled (semi-)rigid polyurethane and urethane-modified polyisocyanurate foams. Such optional additives include crosslinking agents, for examples low molecular weight polyols such as triethanolamine, foam-stabilizing agents or surfactants, for example siloxane-oxyalkylene copolymers, urethane catalysts, for example tin compounds such as stannous octoate or dibutyltin dilaurate or tertiary amines such as dimethylcyclohexylamine or triethylene diamine, fire retardants, for example halogenated alkyl phosphates such as tris chloropropyl phosphate or alkyl phosphonates, and additional cell-opening agents such as inert particles, polymer particles (such as polymer polyols), specific surfactants, incompatible liquids such as solvents or polyols, inorganic fillers such as bentonite clays, silica particles (particularly fumed silica), metal flakes and stearates.

Even better results in terms of open celled content and closed cell gradient are obtained when the present cell opening agents are used in conjunction with any of the generally known cell opening techniques.

For example, the cell opening agents of the present invention can be used supplementary to solid cell opening agents. Examples of suitable solid cell opening agents include polyethylene, polytetrafluoroethylene and hydrophilic silicas (as available from Degussa) These solid cell opening agents are used in amounts varying between 0.01 and 5%, preferably between 0.1 and 1% by weight based on the total foam.

Alternatively, the present cell opening agents can be used supplementary to surface-active cell opening agents. Examples of suitable surface-active cell opening agents include siloxane-oxyalkylene copolymers having high ethyleneoxide contents for example, Tween 21, 20, 40, 60, 85, Span 2C, 60, 80, Myrj 45–52, Atlas 498, G4385, 8919 and Ortigol 501 available from. Goldschmidt and UAX 6164 available from OSi). These surface-active cell opening agents are used in amounts varying between 0.05 and 5% , preferably between 0.1 and 2% by weight based on the isocyanate-reactive composition.

The present cell opening agents can also be used supplementary to steam to open the cells. High water contents are used; generally between 5 and 30% by weight based on the isocyanate-reactive composition.

A preferred supplementary cell opening technique to be used in conjunction with the present cell opening agents involves the use of isocyanate-reactive cyclic carbonates or cyclic ureas. This cell opening technique is described in, for example, EP-A-498628, EP-A-498629, EP-A-419114, EP-A-662494, WO 95/15355 and WO 95/02620, all incorporated herein by reference. The isocyanate-reactive cyclic compounds used in said process correspond to the following formula:

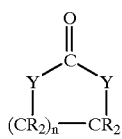

(I)

wherein
Y is O or $NR^1$ wherein each $R^1$ independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$-X wherein X is an isocyanate-reactive group which is OH or $NH_2$ and m is 0, 1 or 2; and n is 1 or 2;
with the proviso that at least one of $R^1$ or R is or comprises an isocyanate-reactive group.

A preferred compound of formula (I) wherein Y is O is an isocyanate-reactive cyclic carbonate which is glycerol carbonate.

Preferred compounds of formula (I) wherein Y is NR are isocyanate-reactive cyclic ureas of formula:

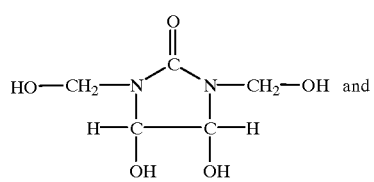

(II)

and

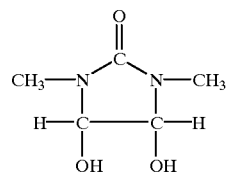

(III)

The isocyanate-reactive cyclic compound is used in amounts ranging from 0.1 to 99%, preferably from 1 to 60% by weight based on the total isocyanate-reactive material. Preferred levels on total foam are between 0.5 and 10% by weight, especially preferred between 1 and 5% by weight.

Preferably said isocyanate-reactive cyclic compounds are used in conjunction with metal salt catalysts.

Preferred metal salt catalysts are those selected among group Ia and group IIa metal salts, more preferably among group Ia and group IIa metal carboxylates.

Particularly suitable catalysts are potassium acetate and potassium ethylhexoate (for example, Catalyst LB available from Imperial Chemical Industries or Dabco T45 available from Air Products).

The metal salt catalyst is used in amounts ranging from 0.01 to 3% by weight based on the total reaction system.

However when used together with the cell opening agents of the present invention also amine catalysts can be used either alone or in combination with a metal salt catalyst.

Examples of suitable tertiary amine catalysts include dimethylcyclohexylamine, bis (dimethylaminoethyl)ether, tetramnethylhexane diamine, triethylenediamine, N-methylmorpholine, pentamethyldiethylenetriamine, tetramethylethylenedianine, 1-methyl-4-dimethylaminoethylpiperazine, 3-methoxy-N-dimethylpropylamnine, N-ethylmorpholine, diethylethanolamine, N-cocomorpholine, N,N-dimethylyl-N', N'-dimethyl isopropylpropylenediamine, N,N-diethyl-3-diethylaminopropylamine, dimethylbenzylamine (for example, Polycat 8, 9, 5 43, BL11, BL17, Dabco T, DMP30, TMR, all available from Air Products and Niax Al, A99, A107, all available from Union Carbide). Preferred amine catalysts include Polycat 5, Polycat 43, Polycat BL11, Polycat BL17, Dabco T, Niax Al, Niax A99 and Niax A107. The amine catalyst is used in amounts ranging from 0.1 to 1.5% by weight based on the total foam.

The catalyst package to be used according to this particular embodiment of the present invention varies from solely a metal salt catalyst (for example, Catalyst LB) to solely an amine catalyst (for example, Polycat 43 or Dabco T) and anything thereinbetween (for example, a mixture of Catalyst LB and Niax Al).

In order to obtain fine celled open celled (semi-) rigid polyurethane foams insoluble fluorinated compounds as described above can be used together with the isocyanate-reactive cyclic compounds and the catalysts.

In operating the process for making open celled (semi-) rigid polyurethane foams, the known one-shot, prepolymer or semi-prepolymer techniques may be used together with conventional mixing methods and the (semi-)rigid foam may be produced in the form of slabstock, mouldings, cavity fillings, sprayed foam, frothed foam or laminates with other materials such as hardboard, plasterboard, plastics, paper or metal.

By using the cell opening agents of the present invention preferably together with isocyanate-reactive cyclic ureas or carbonates, open celled (semi-)rigid polyurethane foams having a high open cell content even at high overpacks (as high as 50%), a reduced closed cell gradient and fine cells with a reduced cell size gradient are obtained. Foams can be made at an index of between 90 and more than 250.

Foams prepared by the process of the present invention are extremely suitable for filling cavities of thermal insulating devices, which are then afterwards evacuated and sealed or evacuated and refilled with an insulating gas.

The various aspects of this invention are illustrated but not limited by the following examples in which the following ingredients are used:

Polyol A: a polyether polyol of OH number 490 mg KOH/g and functionality 4.2.
Polyol B: a polyether polyol of OH number 540 mg KOH/g and functionality 3. MEG: monoethyleneglycol.
Polyol C: a sorbitol-initiated polyether ployol of OH number 420 mg KOH/g.
Polyol D: a sorbitol-initiated polyether ployol of OH number 495 mg KOH/g.
Polyol E: an amine-initiated polyether polyol of OH number 495 mg KOH/g.
Arcol 1010: polypropylene glycol (OH number 112 mg KOH/g) available from Arco.
PEG 200: polyethylene glycol of molecular weight 200 available from Caldic.
Surfactant: a silicone surfactant.
Nonyl Phenol: an alkoxylated nonyl phenol.
Catalyst LB: a metal salt catalyst available from Imperial Chemical Industries.
Polycat 41: a triazine catalyst available from Air Products.
Cell opening agent: Munch Chemie 494/792/2 which is a blend of tallow diamine and fatty acid ester available from Munch Chemie.
UAX 6164: a surface-active cell opening agent available from OSi.
Ortigol 501: a surface-active cell opening agent available from Goldschmidt.
Fixapret NF: a cyclic urea available from BASF.
Polyisocyanate: a polymeric MDI composition.

EXAMPLE 1

Rigid polyurethane foams were made from the ingredients listed below in Table 1 as follows.

The ingredients of the polyol blend were weighed out in grams and mixed well with shaking and stirring in a suitable container. Once the blend was well mixed the container was sealed and the temperature of the blend was adjusted to 30° C. The polyisocyanate was also adjusted to 30° C. and 248 g thereof was pre-weighed out into a suitable tarred container. The polyisocyanate was added to the polyol blend rapidly and the reacting mixture was stirred for ten seconds using a high shear mixer (3000 RPM) fitted with a suitable bladed propeller mixer as is used in standard laboratory foam preparation/testing. After ten seconds the reaction mix was poured into an open metal box mould heated to 50° C. After pouring a floating lid was placed on the rising foam to simulate restricted moulding rather than so-called free rise foaming. After a period of time (>15 minutes) the foam was removed from the mould and allowed to cure at ambient temperature for 24 hours. After this time the foam was cut to allow testing for density and closed cell content.

Density was measured according to standard DIN 53420. The restricted moulded density was in the range 35 to 40 kg/m$^3$ for all of the prepared foams. Closed cell content was measured according to standard BS 4370 Method 10 using a Micromeretics closed cell measuring machine as is commercially available. The closed cell content was measured in the core of the restricted moulded foam as well as in the surface area of the restricted moulded foam close to the foam skin (−1 cm). A range of closed cell content was measured depending on the proximity to a mould edge the closer the measuring point as to a mould edge the higher the closed cell content).

Free rise foams were also made from the same formulations (so without the floating lid. The free rise density was in the range 22 to 26 kg/m$^2$ for all of the prepared foams. Closed cell content of this free rise foam was measured as well.

Foams were also made with a fixed lid instead of a floating lid to simulate high overpack (about 25%). Closed cell content of these foams was measured as well.

The results are presented in Table 1. These results show that using the cell opening agents of the present invention yields open celled foam (Foam No. 1) with decreased closed cell content compared to foams made using the cell opening techniques of the prior art, especially under overpack conditions (Foam No. 2 and 4). Combining the cell opening technique of the present invention with cell opening techniques of the prior art (Foam No. 3 and 5) further decreases the closed cell content.

TABLE 1

| Foam No. | | 1 | 2 | 3 | 4 | 5 |
|---|---|---|---|---|---|---|
| POLYOL BLEND | | | | | | |
| Polyol A | pbw | 77 | 77 | 77 | 77 | 77 |
| Polyol B | pbw | 10 | 10 | 10 | 10 | 10 |
| MEG | pbw | 5 | 5 | 5 | 5 | 5 |
| Arcol 1010 | pbw | 10 | 10 | 10 | 10 | 10 |
| Surfactant | pbw | 1.0 | 1 | 1.0 | 1.0 | 1.0 |
| Nonyl Phenol | pbw | 10 | 10 | 10 | 10 | 10 |
| water | pbw | 4 | 4 | 4 | 2 | 2 |
| Catalyst LB | pbw | 2 | 2 | 2 | 2 | 2 |
| Cell opening agent | pbw | 3.5 | | 3.5 | | 3.5 |
| UAX 6164 | pbw | | 2 | 2 | | |
| Fixapret NF | pbw | | | | 7.6 | 7.6 |
| Polyisocyanate | pbw | 248 | 248 | 248 | 248 | 248 |
| Closed cell content | | | | | | |
| Moulded Foam Core | % | 10–30 | 30–50 | 8–25 | 15–30 | 5–15 |
| Moulded Foam Surface (Skin included) | % | 25–50 | 15–40 | 25–40 | 40–80 | 10–30 |
| Free Rise Foam | % | 0–5 | 0–10 | 0–5 | 0–5 | 0–5 |
| Moulded Foam High Overpack (25%) Core | % | 25–70 | 73–90 | 25–50 | 33–70 | 5–15 |

EXAMPLE 2

Open celled moulded rigid polyurethane foams were prepared from the ingredients listed below in Table 2 (overpack 15%). Moulded density was around 62 kg/m$^3$. The closed cell content of these moulded foams was measured as in Example 1 above. The two moulded skins were included in the measurement.

Free rise foams were also made from the same formulation. Free rise density was about 31 kg/m$^3$. Closed cell content of these free rise foams was measured as well.

The results are presented in Table 2. These results show that the overall closed cell content is lower for foams according to the present invention than foams of the prior art (Foam No. 7 compared to Foam No. 6; Foam No. 10 compared to Foam No. 11).

TABLE 2

| Foam No. | | 6 | 7 | 8 | 9 | 10 | 11 |
|---|---|---|---|---|---|---|---|
| Polyol C | pbw | 50 | 50 | 50 | 50 | 50 | 50 |
| Polyol D | pbw | 50 | 50 | 22.5 | 22.5 | 22.5 | 22.5 |
| Polyol E | pbw | | | 27.5 | 27.5 | 27.5 | 27.5 |
| PEG 200 | pbw | 5 | 5 | 5 | 5 | 5 | 5 |
| Catalyst LB | pbw | 2 | 2 | 1 | 1 | 1 | 1 |
| Polycat 41 | pbw | 1 | 1 | 1 | 1 | 1 | 1 |
| Surfactant | pbw | 0.5 | 0.5 | 0.5 | 0.5 | 0.5 | 0.5 |
| Ortigol 501 | pbw | 4 | 4 | 4 | 4 | 4 | 4 |
| water | pbw | 5 | 5 | 5 | 5 | 5 | 5 |
| Cell opening agent | pbw | | 1 | 0.1 | 0.3 | 1 | |
| Polyisocyanate | pbw | 230 | 230 | 230 | 230 | 230 | 230 |
| Closed cell content | | | | | | | |
| Free rise foam | % | 0 | 0 | 0 | 0 | 0 | 0 |
| Moulded foam | % | 30 | 10 | 20 | 18 | 5 | 40 |

What is claimed is:

1. Process for making open celled polyurethane foam suitable for use as insulating or structural material comprising the step of reacting an organic polyisocyanate with a polyfunctional isocyanate-reactive composition in the presence of an isocyanate-reactive cyclic compound of formula (I)

$$\underset{(CR_2)_n - CR_2}{\overset{O}{\underset{\|}{Y-C-Y}}} \quad (I)$$

wherein
Y is O or NR' wherein each R' independently is a lower alkyl radical of $C_1$–$C_6$ or a lower alkyl radical substituted with an isocyanate-reactive group; each R independently is hydrogen, a lower alkyl radical of $C_1$–$C_6$ or $(CH_2)_m$-X wherein X is an isocyanate-reactive group which is OH or $NH_2$ and m is 0, 1 or 2; and n is 1 or 2; with the proviso that at least one of R' or R is an isocyanate-reactive group; wherein the reaction is carried out in the presence of a cell opening agent selected from the group consisting of fatty acids, fatty acid amines, fatty acid amides and fatty acid esters.

2. Process according to claim 1 wherein the cell opening agent comprises a fatty acid diamine.

3. Process according to claim 2 wherein the cell opening agent comprises a tallow diamine.

4. Process according to claim 1 wherein the cell opening agent is present in an amount of between 0.1 and 20% by weight based on the foam.

5. Process according to claim 4 wherein the cell opening agent is present in an amount of between 0.5 and 2% by weight based on the foam.

6. Process according to claim 1 wherein the isocyanate-reactive cyclic compound corresponds to formula (II) or (III)

$$HO-CH_2-N\underset{HC-CH}{\overset{\overset{O}{\underset{\|}{C}}}{\diagup\diagdown}}N-CH_2-OH \quad (II)$$
$$\phantom{HO-CH_2-N}\underset{OH\quad OH}{}$$

$$CH_3-N\underset{HC-CH}{\overset{\overset{O}{\underset{\|}{C}}}{\diagup\diagdown}}N-CH_3 \quad (III)$$
$$\phantom{CH_3-N}\underset{OH\quad OH}{}$$

7. Process according to claim 1 wherein said cyclic compound is used in amounts ranging between 0.5 and 10% by weight based on the total foam.

8. Process according to claim 1 wherein the reaction is carried out in the presence of a metal salt catalyst.

9. Process according to claim 8 wherein said metal salt catalyst is a group Ia or group IIa metal carboxylate.

10. Process according to claim 1 wherein the reaction is carried out in the presence of an amine catalyst.

11. Process according to claim 10 wherein said amine catalyst is a triethylenediamine or bis(dimethylaminoethyl) ether.

12. Process according to claim 1 wherein the reaction is carried out in the presence of an insoluble fluorinated compound.

13. Process according to claim 12 wherein said insoluble fluorinated compound is a substantially fluorinated or perfluorinated hydrocarbon.

14. Process according to claim 13 wherein said insoluble fluorinated compound is perfluoropentane, perfluorohexane or perfluoro(4-methylpent-2-ene).

15. Process according to claim 12 wherein said insoluble fluorinated compound is present in an amount of between 0.1 and 5% by weight based on the total foam.

16. Open celled polyurethane foam suitable for use as insulating or structural material produced by the process of claim 1.

17. Evacuated insulation panel comprising a filler enveloped in an impermeable barrier wherein the filler comprises the open celled polyurethane foam according to claim 16.

18. Thermal insulating unit comprising the open celled polyurethane foam according to claim 16 in the cavity between its outer and inner walls.

19. Thermal insulating unit according to claim 18 wherein said cavity is evacuated and sealed.

20. Thermal insulating unit according to claim 19 wherein said cavity is evacuated, refilled with an insulating gas and sealed.

21. Isocyanate-reactive composition comprising the isocyanate-reactive cyclic compound and the cell opening agent as defined in claim 1.

* * * * *